United States Patent [19]
Hon

[11] 4,344,042
[45] Aug. 10, 1982

[54] SELF-REGENERATIVE LASER OSCILLATOR-AMPLIFIER

[75] Inventor: David T. Hon, Los Angeles, Calif.

[73] Assignee: Hughes Aircraft Company, Culver City, Calif.

[21] Appl. No.: 126,592

[22] Filed: Mar. 3, 1980

[51] Int. Cl.$^3$ ............................................ H01S 3/098
[52] U.S. Cl. ..................................... 330/4.3; 372/19; 372/21; 372/33; 372/93; 307/428
[58] Field of Search ............................. 330/4.3, 4.5; 331/94.5 C, 94.5 N, 94.5 T; 307/425, 428

[56] References Cited

U.S. PATENT DOCUMENTS

| | | | |
|---|---|---|---|
| 3,817,604 | 6/1974 | Watt | 331/94.5 T |
| 4,005,935 | 2/1977 | Wang | 330/4.3 |
| 4,023,117 | 5/1977 | Schade | 331/94.5 N |
| 4,102,572 | 7/1978 | O'Meara | 332/7.51 |
| 4,107,628 | 8/1978 | Hill et al. | 331/94.5 N |
| 4,112,390 | 9/1978 | Farcy | 330/4.3 |
| 4,145,671 | 3/1979 | Hellwarth | 332/7.51 |
| 4,158,176 | 6/1979 | Hunt et al. | 331/94.5 T |
| 4,220,928 | 9/1980 | Bloom et al. | 330/4.3 |
| 4,233,571 | 11/1980 | Wag et al. | 331/94.5 T |

OTHER PUBLICATIONS

Nosach, "Cancellation of Phase Distortions . . . Brillouin Mirror", 12/5/72, pp. 617–621, ZhETF Pis. Red, vol. 16, #11.

Bloom, "Observation of Amplified . . . Sodium Vapor", 3/78, pp. 58–60, Optics Letters, vol 2, #3.

Fisher et al., "On–Resonant Phase Conjugate Reflection . . . $CO_2$", 5/79, pp. 140–142, Optics Letters, vol. 4, #5.

Wang, "Corrections of Phase Aberrations . . . Scattering", 1/78, pp. 4–6, Optics Letters, vol. 2, #1.

Primary Examiner—Nelson Moskowitz
Attorney, Agent, or Firm—Kenneth W. Float; William H. MacAllister

[57] ABSTRACT

Apparatus is provided which includes a laser oscillator for providing light along a first optical path, and a laser amplifier for amplifying light along a second optical path. Means for coupling light between the first and second optical paths is disposed at one end of the laser amplifier, and a nonlinear medium disposed at the other end thereof for intercepting light provided along the first and second optical paths. The laser oscillator provides a single-mode laser beam along the first optical path which is made incident upon the nonlinear medium from substantially opposite directions. A portion of the beam from the laser oscillator is coupled through the laser amplifier, which forms a probe beam that samples the laser amplifier system. This beam further impinges upon the nonlinear medium and interacts with the counter-propagating laser beams therein. A phase-conjugated beam is reflected from the nonlinear medium and is amplified by the amplifying medium providing a single-mode output beam of the laser amplifier system. A portion of the phase conjugated beam is reflected back into the oscillator and used as the counter-propagating pump beams for the phase conjugation process. This self-pumping feature allows for minimization of the pumping power required for the oscillator. The combination provides for a phase corrected, diffraction-limited beam at the output of the system. A second embodiment utilizes the amplifier medium to accomplish both amplification and phase conjugation therein.

5 Claims, 5 Drawing Figures a.

b.

SELF-REGENERATIVE LASER OSCILLATOR-AMPLIFIER

TECHNICAL FIELD

The present invention relates generally to lasers and more particularly to lasers which self-compensate for optical inhomogenities in strongly pumped laser media.

BACKGROUND OF THE INVENTION

Optical inhomogenities in strongly pumped laser media cause undesirable divergence in the output beam. The optical inhomogenities are caused by such problems as vibration, misalignment and heating of the reflecting surfaces, and aberations and turbulence in the lasing medium. These undesirable conditions result in lower system efficiency and keep the system from performing at its diffraction limit.

Recent research and development in the area of phase conjugation has sought to provide solutions to many of these problems. However, no systems developed to date have dealt with efficiency problems, such as reducing the demand on the flow system in flowing media lasers, and increasing the average and/or peak power levels, while improving the overall beam quality in high brightness lasers by achieving single-mode output at high power. In addition, present systems have not been able to make phase conjugate corrections to the laser beam wavefronts without suffering efficiency losses. Accordingly, a system which provides a solution to these practical problems would be a significant improvement in the art.

SUMMARY OF THE INVENTION

Accordingly, it is an object of the present invention to provide a laser system which provides for intracavity phase conjugation of the laser beam wavefronts without suffering efficiency losses.

It is a further of the present invention to provide a laser system having improved beam quality, in that a single-mode output is achieved, along with potentially increased average and/or peak power.

In accordance with these and other objects of the present invention, there is provided a self-regenerative laser oscillator-amplifier system which comprises a laser oscillator that provides light of a single lasing mode along a first optical path. The light is generally of the single transverse and longitudinal lasing mode. Coupling means, such as a beamsplitter, is disposed in the first optical path which transmits a portion of the light along the first optical path to continue oscillator operation and which reflects a portion of the light along a second optical path. A laser amplifier is disposed in the second optical path for amplifying light provided thereto. A nonlinear medium is disposed in the first and second optical paths so as to intercept light provided by the oscillator and amplifier. The nonlinear medium provides phase conjugate light using the process of four-wave mixing in response to the light intercepted thereby. The phase conjugate light is transmitted back through the amplifier to the coupling means, which transmits part of the light as an amplified single-mode output beam of the system and reflects the remainder of the light along the first optical path to continue the operation of the oscillator.

In operation, the light beams from the laser amplifier and laser oscillator interact with the nonlinear medium in a manner known as four-wave mixing. The laser oscillator provides for two counter-propagating pump beams impinging upon the nonlinear medium while the laser amplifier provides a probe beam which interacts with the pump beams in the nonlinear medium to produce the phase conjugate beam. The coupling means allows a portion of the amplified beam to be coupled back through the laser oscillator thus reducing the energy required to operate the laser oscillator. The coupling feature provides for full or partial self-pumping of the nonlinear medium, and hence reduces the external pumping required to stimulate the laser oscillator.

Decreasing the energy required to operate the oscillator increases the overall efficiency of the system. Also, single-mode oscillators are inherently inefficient, and lessening the inefficient effects thereof provides for increased system efficiency while retaining output beam quality. Under certain situations, such as when using chemical lasers, the oscillator may only be needed for system start-up, and once the system is operational, the oscillator pumping mechanism may be turned off, thus eliminating most of the potential sources of inefficiency.

A second embodiment is provided having substantially the same configuration, but the nonlinear medium is merged into the amplifying medium. As such, a portion of the amplifying medium amplifies the laser light, while a portion of the medium provides for the four-wave mixing phase conjugation process.

BRIEF DESCRIPTION OF THE DRAWINGS

The foregoing and other objects and features of the present invention may be more readily understood with reference to the following detailed description taken in conjunction with the accompanying drawings in which like reference numerals designate like structural elements, and in which.

DETAILED DESCRIPTION OF THE INVENTION

Figure 1:
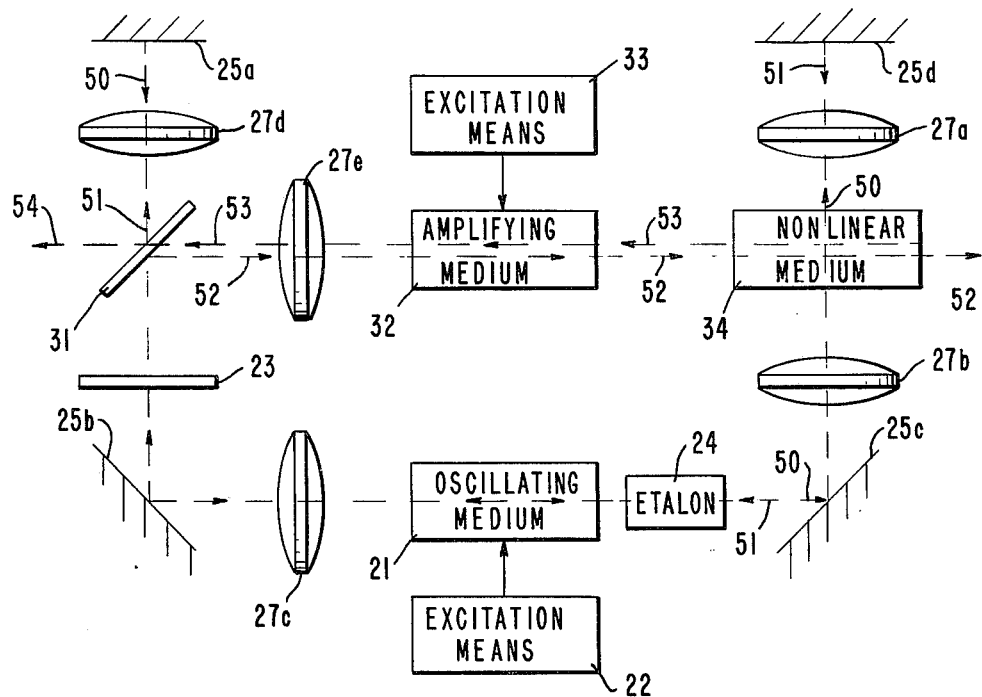
FIG. 1 illustrates a self-regenerative laser oscillator amplifier system in accordance with the present invention.

Referring to FIG. 1, the system employs a laser oscillator including an oscillating medium 21 and excitation means 22 therefor, a mode selecting aperture 23, and an etalon 24, a plurality of mirrors 25a–d and various optical elements 27a–d. The cavity of the laser oscillator is bounded by mirrors 25a and 25d which define the resonant cavity. The elements of a laser oscillator generally are arranged along a first optical path between the mirrors 25a and 25d. The mode selecting aperture 23 and etalon 24 are shown herein as being on opposite sides of the oscillating medium 21, however, they may be located at appropriate positions on either side thereof. The laser oscillator may be any gas, chemical, dye, or solid state laser, wherein the oscillating medium 21 may be ruby, YAG, $CO_2$, HF, or eximer, or the like.

The mode selecting aperture 23 and etalon 24 are provided to obtain a single-mode, high quality beam from the laser oscillator. The mode selecting aperture 23 is sized to permit only a single transverse lasing mode to pass therethrough. The etalon 24, or a plurality of etalons, if required, is used like an interference filter to narrow the laser bandwidth of the laser oscillator. The etalon 24 assists in providing for a single longitudinal mode beam to enhance obtaining high efficiency in the four-wave mixing interaction, which will be described more fully hereinbelow. It may be noted that the single longitudinal lasing mode may not be required to obtain increased system efficiency in all system configurations, and hence a plurality of longitudinal lasing modes may be employed without degrading system performance. Thus, depending upon the lasing media used in the present invention, overall system efficiency may not be enhanced substantially by providing a single longitudinal mode in addition to the single transverse mode. Accordingly, the etalon 24 may not be required in all circumstances.

For a better understanding of lasing modes and their relation to the present invention, the following is pertinent. In a laser cavity, a plurality of longitudinal lasing modes may be present, and may include as many as 50 or so modes in a YAG laser, for instance. A mode is present if the ratio of the laser cavity length to the wavelength of the laser light is equal to an integer. Of course, for lasing to occur, the wavelength must be within the gain bandwidth of the laser. A particular longitudinal mode within the gain bandwidth of the lasing medium is selected by use of the etalon 24. Transverse modes are determined by the boundary conditions imposed on the laser light by optics, apertures, mirrors, and the lasing medium or the like. The fundamental transverse lasing mode would be one for which the laser beam is a single circular beam pattern when viewed in cross-section. The lowest order modes are generally more collimated, and hence more desirable.

There is also provided coupling means, such as a beamsplitter 31, a laser amplifier including an amplifying medium 32 and associated excitation means 33, and a nonlinear medium 34, disposed along a second optical path. The beamsplitter 31 is also disposed along the first optical path for reflecting light between the two paths. The nonlinear medium 34 is also disposed along the first optical path so as to intercept the light provided therealong, the nonlinear medium 34 thus being disposed within the cavity of the oscillator. The beamsplitter 31 is positioned adjacent to one end of the oscillator cavity while the nonlinear medium 34 is positioned adjacent to the other end thereof. The amplifying medium 32 is comprised of the same material and operates substantially at the same frequency as the oscillating medium 21. The nonlinear medium 34 may be carbon disulfide, or a dye, or the like.

Figure 2:
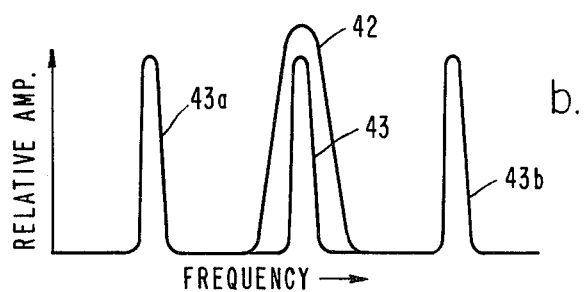
FIG. 2 represent transmission versus frequency curves for certain elements of the present system.

In operation, the laser oscillator provides a single-mode laser beam reflected along the first optical path between mirror 25a and 25d. The counter-propagating beams are indicated by arrows 50 and 51. This beam is of the fundamental longitudinal and transverse lasing mode as determined by the mode selecting aperture 23 and in addition, the beam has a very narrow frequency bandwidth determined by the etalon 24. Referring now to FIG. 2, a better understanding of the operation of the etalon 24 may be obtained. FIG. 2a shows a plot of relative amplitude versus frequency for a typical oscillating medium operating in the non-lasing and lasing conditions. The trace identified as 41 illustrates the non-lasing condition and as such the oscillating medium amplifies light over a relatively wide frequency band. In the lasing condition, the oscillating medium 21 amplifies a very narrow bandwidth identified by trace 42. Referring now to FIG. 2b, trace 42 is shown superimposed over the transmission curve 43 provided by the etalon 24. The etalon 24 acts as an interference filter as is indicated by the curves 43, 43a and 43b. The etalon 24 is designed such that one of its transmission spikes substantially overlaps the oscillating medium bandwidth so it provide for narrowing thereof. Accordingly, the laser linewidth of the oscillating medium 21 is narrowed to that provided by the etalon 24 and as shown by curve 43.

Thus, the single-mode beam is continuously reflected along the first optical path. This beam is focused by means of optical elements 27a and 27b onto the nonlinear medium 34. The oscillating medium 21 thus provides for counter-propagating beams 50,51 impinging upon the nonlinear medium 34. The beamsplitter 31 splits off a portion of the single-mode beam and applies it through optical element 27e to the amplifying medium 32, wherein it is amplified and applied to the nonlinear medium 34. This beam is identified as probe beam 52. The interaction between the nonlinear medium 34, the counter-propagating single-mode laser beams 50,51 and the probe beam 52 provided by the amplifying medium 32, constitutes four-wave mixing as it is known in the art. The present system also employs what is known as intracavity phase conjugation. Accordingly, a phase conjugated laser beam 53 is reflected from the nonlinear medium 34 back through the amplifying medium 32 to the beamsplitter 31 which transmits a single-mode output beam 54 of the system. A portion of the conjugated beam 53 is reflected back into the first optical path by means of the beamsplitter 31. The portion of the energy reflected by the beam-splitter 31 is sufficient to sustain the four-wave mixing process in the nonlinear medium 34, and as such, the excitation means 22 may be turned down, or off, so as to lessen the amount of energy provided thereby. The single longitudinal and transverse mode oscillator is typically inefficient in operation. Therefore, turning the excitation means 22 down, or off, is a major factor in increasing the overall efficiency of the system.

The concept of four-wave mixing is described in numerous publications which provide for a better understanding of the mathematics and physics involved in this process. These publications include "Recording Two-Dimensional and Three-Dimensional Dynamic Holograms in Transparent Substances", Stepanov et al, Soviet Physics-Doklady 16(1) 46, (July 14, 1970); "Amplified Reflection, Phase Conjugation and Oscillation in Degenerate Four-Wave Mixing", A. Yariv, *Optics Letters*, Vol. 1, Pg. 16, July 1973; and "Generation of Time Reversed Wave Fronts by Nonlinear Refraction", R. W. Hellwarth, *JOSA*, Vol. 67, No. 1, January 1977.

Figure 3:
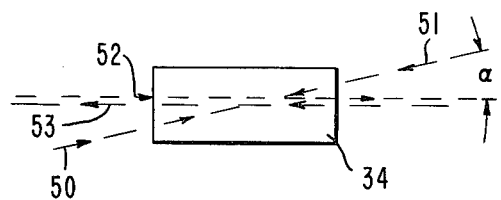
FIG. 3 illustrates one embodiment of a nonlinear medium for use in the present invention.

In order to improve the efficiency of the phase conjugating process, the nonlinear medium 34 and the counter-propagating pump beams 50, 51 are generally oriented so as to provide for the greatest interaction length therebetween. Referring to FIG. 3, this is illustrated in that the counter-propagating pump beam 50, 51 are injected into the nonlinear medium 34 substantially in opposite directions, and generally at an angle $\alpha$, which is on the order of 0° to 1°. The interaction length constitutes that volume of the nonlinear medium 34 in which the counter-propagating pump beams 50, 51 and the probe beam 52 overlap. This provides for the maximum phase conjugation efficiency.

Figure 4:
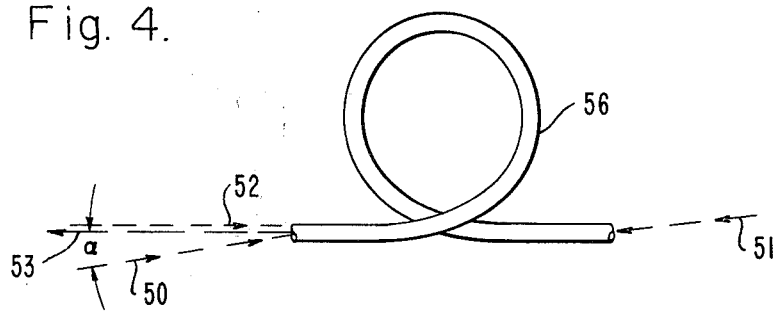
FIG. 4 illustrates a second nonlinear medium for use in the present invention.
Figure 4:
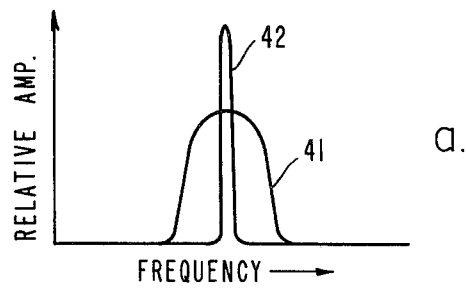

FIG. 4 shows a typical optical waveguide 56 which may be employed as the nonlinear medium 34. FIG. 4 also shows an injection scheme similar to that of FIG. 3 which provides for the maximum interaction length in the waveguide 56 by the probe beam 52, pump beams 50, 51 and the waveguide 56.

In summary, the overall operation of the system of FIG. 1 is such that the laser oscillator provide a single-mode laser beam reflected along the first optical path indicated by laser beams 50 and 51. The counter-propagating laser beams 50, 51 are focused onto the nonlinear medium 34 by means of optical elements 27a and b. In addition, a portion of the single-mode beam is split off so as to provide a probe beam 52 which is transmitted through the amplifying medium 32 and onto the nonlinear medium 34. The probe beam 52 samples the optical elements, indicated by optics 27e, and the amplifying medium 32, which causes distortion of the wavefronts of the laser beam in proportion to the optical inhomogenities encountered. A phase conjugated beam 53 is reflected from the nonlinear medium 34 along the second optical path. A portion of the phase conjugated beam 53 is split off by the beamsplitter 31 and returned along the first optical path back through the oscillating medium 21. This beam is at a sufficiently high power due to amplification in the amplifying medium 32 that it is able to sustain the four-wave mixing process in the nonlinear medium 34. This allows for the excitation means 22 for the oscillating medium 21 to be turned down, or turned off, depending upon the intensity of the beam. Thus, in essence, the system is self-regenerative and allows for consumption of less power with an increase in quality of the amplified output beam 53.

Figure 5:
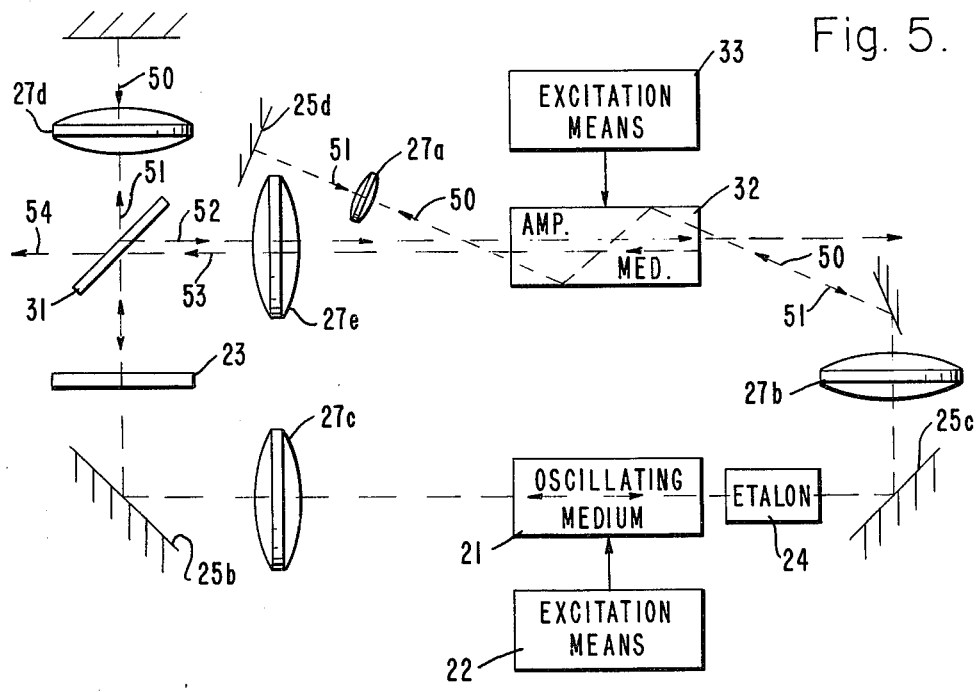
FIG. 5 illustrates a second embodiment of a system in accordance with the present invention.

Referring now to FIG. 5, there is shown a self-regenerative laser oscillator-amplifier system which is substantially identical to the system of FIG. 1, but wherein the amplifying medium 32' provides for both amplifying of light incident thereupon, and phase conjugation, as in the nonlinear medium 34. Typical amplifying media 32' which may be employed in this embodiment include ruby, $CO_2$, or a population-inverted gain medium, or the like. The use of a population inverted gain medium to accomplish the four-wave mixing process may be better understood by reference to a paper by B. J. Feldman, et al, entitled, "On Resonant Phase-Conjugate Reflection and Amplification at 10.6 μm in Inverted $CO_2$", R. A. Fisher, B. J. Feldman, *Optics Letters,* Vol. 6, No. 5 (1979). The operation of the system of FIG. 5 is substantially identical to that of FIG. 1, but the phase conjugation occurs in the amplifying medium 32'. The interaction region is provided in the volume of the amplifying medium 32' in which the probe beam 52 interacts with the counter-propagating pump beams 50, 51.

Thus there has been provided an improved laser amplifying system which has improved beam quality and increased power, while providing for more efficient operation and conventional laser amplifier systems.

It is to be understood that the above-described embodiments of the invention are merely illustrative of the many possible specific embodiments which represent applications of the principles of the present invention. Numerous and varied other arrangements may readily be devised in accordance with these principles by those skilled in the art without departing from the spirit and scope of the invention.

I claim:

1. Laser apparatus for providing an amplified single-mode output beam, said apparatus comprising:

laser oscillator means disposed along a first optical path for providing light of a single lasing mode therealong;

coupling means disposed along said first optical path for transmitting a portion of the light incident thereupon along said first optical path, and for reflecting the remainder of said light along a second optical path;

laser amplifier means disposed along in said second optical path for amplifying light of said single lasing mode made incident thereupon; and nonlinear medium means, disposed in said first and second optical paths so as to intercept light provided by said laser amplifier means and said laser oscillator means, for providing phase conjugate light in response to the light intercepted thereby in a four-wave mixing manner, said phase conjugate light being transmitted along said second optical path through said laser amplifier means to said coupling means which transmits a portion of the light incident thereupon to provide an amplified single-mode output beam of said apparatus, and reflects the remainder of the light along said first optical path.

2. Laser apparatus for providing an amplified single-mode output beam, said apparatus comprising:

laser oscillator means disposed along a first optical path for providing light of a single lasing mode therealong;

coupling means disposed along said first optical path for transmitting a portion of the light incident thereupon along said first optical path and for reflecting the remaining portion of the light along a second optical path; and means, disposed in said first and second optical paths so as to intercept light provided therealong, for amplifying said single-mode light provided along said second optical path and for providing phase conjugate light in response to light intercepted thereby in a four-wave mixing manner, said phase conjugate light being transmitted along said second optical path to said coupling means which transmits a portion of the light to provide an amplified single-mode output beam of said apparatus, and reflects the remainder of the light along said first optical path.

3. Laser apparatus for providing an amplified single-mode output beam, said apparatus comprising:

laser oscillator means disposed along a first optical path for providing light of a single lasing mode therealong, said light comprising a first beam travelling in one direction and a second beam travelling in the opposite direction;

coupling means disposed along said first optical path for transmitting a portion of the light incident thereupon along said first optical path, and for reflecting the remainder of the light along a second optical path so as to form a third beam therealong;

laser amplifier means disposed in said second optical path for amplifying light of said single lasing mode made incident thereupon; and nonlinear medium means, disposed in said first and second optical paths, for responding to said first, second and third beams in a four-wave mixing manner, and providing a phase conjugate beam of said third beam, which is transmitted along said second optical path through said laser amplifier means to said coupling means, which transmits a portion of the light incident thereupon to provide an amplified single-mode output beam of said apparatus, and which reflects the remaining portion of the light along said first optical path.

4. Laser apparatus for providing an amplified single-mode output beam, said apparatus comprising:

laser oscillating means disposed along a first optical path for providing light of a single lasing mode therealong, said light comprising a first beam travelling in one direction and a second beam travelling in the opposite direction;

coupling means disposed along said first optical path for transmitting a portion of the light incident thereupon along said first optical path, and for reflecting the remainder of the light along a second optical path so as to form a third beam therealong; and means, disposed in said first and second optical paths, for amplifying single-mode light provided along said second optical path and for responding to said first, second and third beams in a four-wave mixing manner, and providing a phase conjugate beam of said third beam, which is transmitted along said second optical path through said laser amplifier means to said coupling means, which transmits a portion of the light incident thereupon to provide an amplified single-mode output beam of said apparatus, and which reflects the remaining portion of the light along said first optical path.

5. The apparatus of claims 1, 2, 3, or 4 wherein said laser oscillator means comprises an oscillating medium and an excitation means for providing pumping energy to said oscillating medium, and wherein during the operation of said apparatus, the amount of energy necessary to pump said oscillating medium is lessened due to the portion of the amplified light coupled from said second optical path to said first optical path which provides for the continued operation of said laser oscillator means independently of said excitation means.

* * * * *